United States Patent
Dounaev et al.

(10) Patent No.: US 7,903,759 B2
(45) Date of Patent: Mar. 8, 2011

(54) METHOD FOR TRANSMITTING AND RECEIVING QUADRATURE-AMPLITUDE MODULATION SIGNALS, SYSTEM FOR IMPLEMENTING THEREOF, MACHINE-READABLE MEDIUM, AND APPLICATION OF THE METHOD FOR SYNCHRONIZING RECEPTION OF AMPLITUDE MODULATION SIGNALS

(75) Inventors: Igor Borisovich Dounaev, Moscow District (RU); Alexander Vladimirovich Grigoriev, Gomel (BY); Leonid Alexeevich Letunov, Gomel (BY)

(73) Assignee: Igor Borisovich Dounaev, Khimki, Moscow District (RU)

( * ) Notice: Subject to any disclaimer, the term of this patent is extended or adjusted under 35 U.S.C. 154(b) by 145 days.

(21) Appl. No.: 11/957,545

(22) Filed: Jan. 27, 2009

(65) Prior Publication Data
US 2009/0122912 A1     May 14, 2009

Related U.S. Application Data

(63) Continuation of application No. PCT/RU2006/000261, filed on May 24, 2006.

(30) Foreign Application Priority Data

Jun. 15, 2005   (RU) ................................ 2005118509

(51) Int. Cl.
*H04L 27/36*     (2006.01)
(52) U.S. Cl. ........................................................ 375/298
(58) Field of Classification Search .......... 375/260–261, 375/285, 298, 316, 320, 322, 340, 342
See application file for complete search history.

(56) References Cited

U.S. PATENT DOCUMENTS

| 4,518,922 | A | 5/1985 | Luecke |
| 5,872,812 | A | 2/1999 | Saito et al. |
| 6,282,168 | B1 | 8/2001 | Vijayan et al. |
| 6,671,333 | B1 | 12/2003 | Lucioni |
| 6,697,440 | B1 | 2/2004 | Shiraishi et al. |
| 6,717,462 | B2 | 4/2004 | Loheit et al. |

(Continued)

FOREIGN PATENT DOCUMENTS

EP     1217724 A1     6/2002

(Continued)

OTHER PUBLICATIONS

English Translation of Abstract of Japanese Publication No. JP2000032072, published on Jan. 28, 2000.

(Continued)

*Primary Examiner* — Khanh C Tran
(74) *Attorney, Agent, or Firm* — Houston Eliseeva, LLP.

(57) ABSTRACT

The invention relates to signal transmitting engineering. The use of the inventive method in systems for transmitting and receiving quadrature amplitude-modulation signals (QAM) exhibiting a low carrier frequency synchronization threshold makes it possible to decrease a demodulation threshold by means of said low carrier frequency synchronization threshold. The result is attainable by supplementing a burst of M m-level sensitive QAM symbols by predetermined symbols, one part of which remains constant form one burst to another and the other part is periodically invertible in certain bursts, thereby the QAM signal components corresponding to the additional predetermined symbols (whose frequencies are known) are extracted on a receiving side. The inversion frequency is determined according to said components, thereby making it possible to eliminate the ambiguity of the receiving frequency synchronization control and to approach the Shannon's threshold.

20 Claims, 6 Drawing Sheets

U.S. PATENT DOCUMENTS

| | | | |
|---|---|---|---|
| 6,727,772 B2 | 4/2004 | Kravtsov | |
| 6,795,427 B1 * | 9/2004 | Klein et al. | 370/347 |
| 6,901,112 B2 * | 5/2005 | McCorkle et al. | 375/259 |
| 7,095,707 B2 * | 8/2006 | Rakib et al. | 370/204 |
| 2004/0190663 A1 | 9/2004 | Carsello et al. | |

FOREIGN PATENT DOCUMENTS

| | | |
|---|---|---|
| JP | P2000-32072 A | 1/2000 |
| JP | P2001-237908 A | 8/2001 |
| RU | 2136115 C1 | 8/1999 |
| RU | 2141730 C1 | 11/1999 |
| RU | 2232479 C2 | 7/2004 |

OTHER PUBLICATIONS

English Translation of Abstract of Japanese Publication No. JP2001237908, published on Aug. 31, 2001.

International Search Report from International Application No. PCT/RU2006/000261, filed May 24, 2006, mailed on Oct. 26, 2006.

Clover-II Waveform & Protocol. HAL Communications Corporation. Engineering Document E2006 Rev A. Dec. 17, 1997.

English translation of International Preliminary Report on Patentability, dated Apr. 15, 2008, from International Application No. PCT/RU2006/000261, filed May 24, 2006.

* cited by examiner

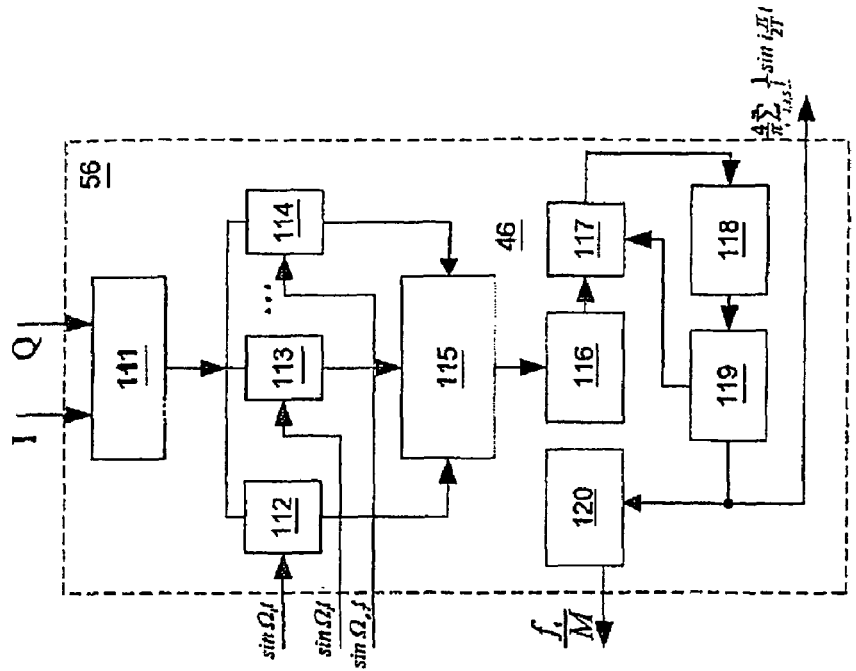
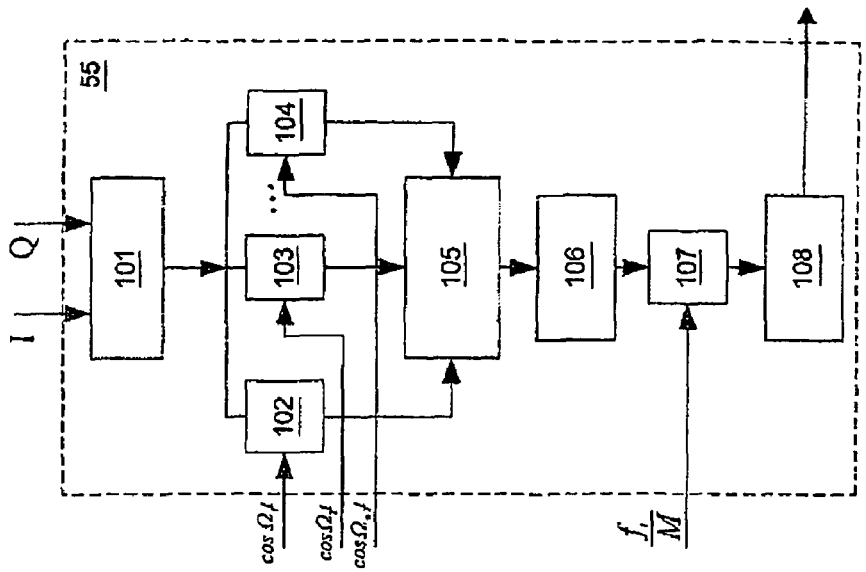

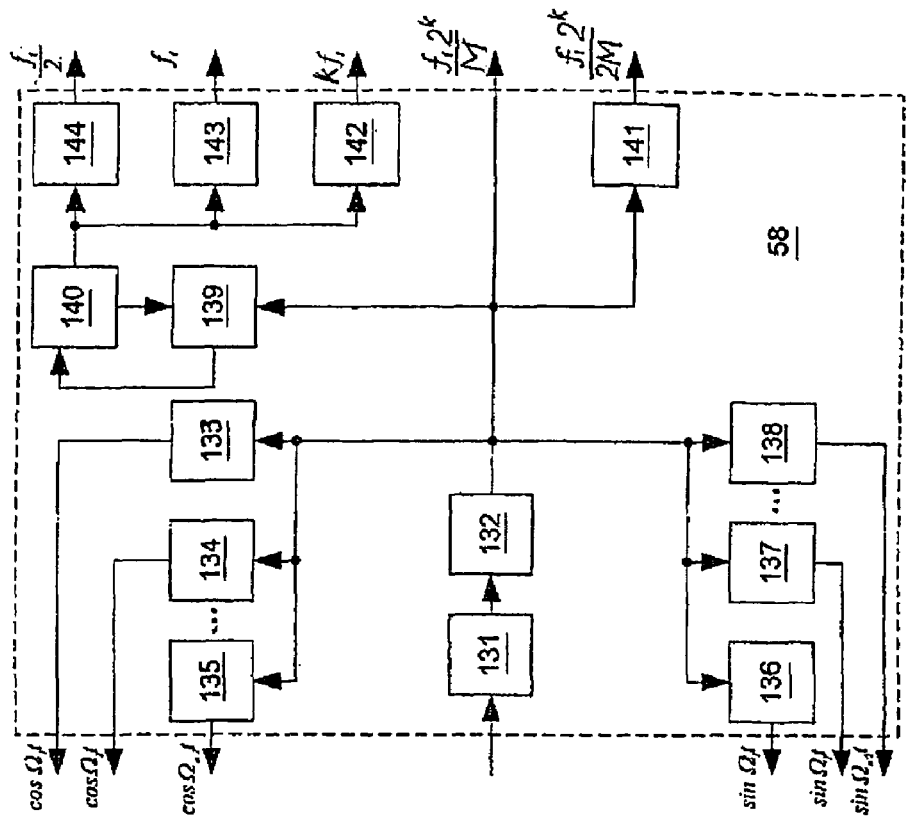
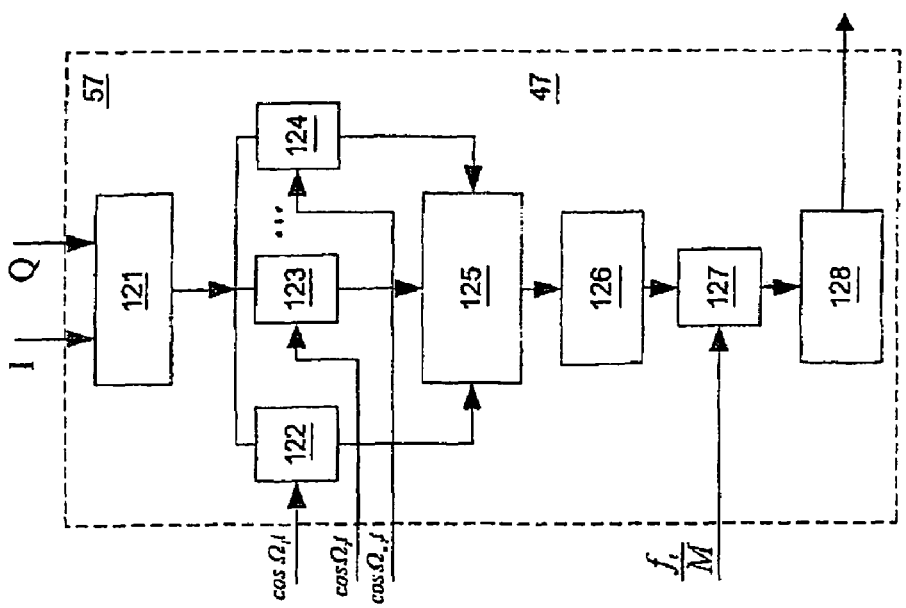
Fig. 8
Fig. 7

METHOD FOR TRANSMITTING AND RECEIVING QUADRATURE-AMPLITUDE MODULATION SIGNALS, SYSTEM FOR IMPLEMENTING THEREOF, MACHINE-READABLE MEDIUM, AND APPLICATION OF THE METHOD FOR SYNCHRONIZING RECEPTION OF AMPLITUDE MODULATION SIGNALS

RELATED APPLICATIONS

This application is a Continuation of PCT application serial number PCT/RU2006/000261 filed on May 24, 2006, which in turn claims priority to Russian Patent Application No. RU 2005118509 filed on Jun. 15, 2005, both of which are incorporated herein by reference in their entirety.

BACKGROUND OF THE INVENTION

This invention relates to the signal transmission technique. Particularly, this invention relates to the method and system for transmitting and receiving quadrature-amplitude modulation signals (QAM) with the low synchronization threshold on the carrier frequency.

In transmitting and receiving signals modulated in one or another manner, a very important characteristic is the demodulation threshold, i.e., the ratio of the signal power to the noise power (signal-to-noise ratio, SNR), at which the carrier wave of the signal being received ceases to be derived, which results in loss of the reception. The demodulation threshold depends essentially on the demodulation type employed at the transmission side, and the noiseless coding type.

It is known from the theory that effectiveness of any communication system is defined by the frequency and power resources thereof, i.e., by the bandwidth occupied with the signal, and by the signal power for providing required rates for transmitting and receiving information. In general, this dependence of the rate for transmitting and receiving information upon the frequency spectrum width and signal power is defined by Shannon's equation:

$$C = B\log_2 \frac{P_S + P_N}{P_N}, \quad (1)$$

where C is the information transmission and reception rate, B is the frequency bandwidth of the signal being transmitted in a communication channel, $P_C$ is the signal power at the receiver input, $P_N$ is the noise power reduced to the receiver input in the bandwidth B.

Modern communication systems represent modern technologies constructed for specific information transmission rates. The following modulation types are used most often:
- in the satellite communication: QPSK, 8PSK, 16QAM, 32QAM;
- in relay repeater lines: BPSK, QPSK, 8PSK, 16QAM, 32QAM, 64QAM, 128 QAM, 256QAM;
- in cable lines: QPSK, 16QAM, 64QAM, 256QAM;
- in telephony: from 16QAM to 16384QAM.

The most often used types of noiseless coding employed in modern modems are Viterbi (convolutional) coding, coding with Reed-Solomon codes, trellis code modulation (TCM), turbocoding [1], and low density parity check (LDPC) coding [3, 4]. The latter is the most effective type of noiseless coding that allows, with the loss of only 0.8-1.5 dB, to achieve the maximum information transmission rates defined by the equation (1). The Table 1 shows the LDPC coding characteristics for various coding rates and modulation types.

The obstacle for implementing the achieved characteristics of the LDPC coding in the modern communication systems is too high demodulation thresholds (carrier recovery thresholds) in the existing demodulators. Thus, for the QPSK type demodulation, the existing demodulators begin the carrier synchronization at the S/N ratio of about 0 dB, for the 16QAM type modulation at the S/N ratio of about +8.9 dB, and for the 32QAM type modulation at the ratio of about +12.7 dB [2].

TABLE 1

| Spectral effectiveness (bps/Hz) | Modulation type | Coding rate | S/N (dB) | Shannon's S/N threshold (dB) |
|---|---|---|---|---|
| 0.5 | QPSK | 1/4 | −2.35 | −3.87 |
| 0.666 | QPSK | 1/3 | −1.24 | −2.2 |
| 0.8 | QPSK | 2/5 | −0.3 | −1.3 |
| 1 | QPSK | 1/2 | 1 | 0 |
| 1.2 | QPSK | 3/5 | 2.23 | 1.1 |
| 1.5 | QPSK | 3/4 | 4.03 | 2.5 |
| 1.6 | QPSK | 4/5 | 4.68 | 3.1 |
| 0.75 | 8QAM | 1/4 | −0.8 | −1.7 |
| 1 | 8QAM | 1/3 | 0.7 | 0 |
| 1.2 | 8QAM | 2/5 | 1.85 | 1 |
| 1.5 | 8QAM | 1/2 | 3.4 | 2.5 |
| 1.8 | 8QAM | 3/5 | 5 | 3.85 |
| 2 | 8QAM | 2/3 | 6.2 | 4.77 |
| 2.25 | 8QAM | 3/4 | 7.5 | 5.8 |
| 1 | 16QAM | 1/4 | 0.5 | 0 |
| 1.333 | 16QAM | 1/3 | 2.2 | 1.6 |
| 1.6 | 16QAM | 2/5 | 3.5 | 3 |
| 2 | 16QAM | 1/2 | 5.5 | 4.77 |
| 3 | 16QAM | 3/4 | 10.1 | 8.45 |
| 3.2 | 16QAM | 4/5 | 11 | 9.2 |
| 1.25 | 32QAM | 1/4 | 1.8 | 1.35 |
| 1.66 | 32QAM | 1/3 | 3.75 | 3.1 |
| 2 | 32QAM | 2/5 | 5.4 | 4.77 |
| 2.5 | 32QAM | 1/2 | 7.5 | 6.7 |
| 3 | 32QAM | 3/5 | 9.5 | 8.5 |
| 4 | 32QAM | 4/5 | 13.5 | 11.75 |
| 1.5 | 64QAM | 1/4 | 2.75 | 2.5 |
| 2 | 64QAM | 1/3 | 5 | 4.77 |
| 2.4 | 64QAM | 2/5 | 6.6 | 6.25 |
| 3 | 64QAM | 1/2 | 9 | 8.45 |
| 3.6 | 64QAM | 3/5 | 11.1 | 10.45 |
| 4 | 64QAM | 2/3 | 12.5 | 11.77 |
| 4.5 | 64QAM | 3/4 | 14.5 | 13.3 |

One can see from the Table 1 that for implementing the entire possibility of the LDPC coding for the QPSK signal at the coding rate of ¼, the demodulator should operate at the ratio $$S/N = 10\log_2 \frac{P_S}{P_N} = -2.35 \text{ dB},$$

while it loses the synchronization as early as 0 dB. For the 16QAM signal at the same coding rate of ¼, the demodulator should have the stable operation at the ratio $$S/N = 10\log_2 \frac{P_s}{P_N} = -0.5 \text{ dB},$$

while it loses the synchronization as early as +8.9 dB, and so on.

The main reason of this appears from the fact that the system for carrier recovery in the modern QPSK and QAM demodulators is non-linear. There is no carrier residue in the spectrum of signals using such modulation types as QPSK, 8PSK, 16QAM, etc., therefore the wave coherent to the carrier is derived from the signal being received by means of some non-linear transformation and following filtration. But any non-linearity restricts the carrier recovery threshold. If only the carrier recovery system is linear, then the demodulation threshold would be less than −3 dB, which would permit the demodulator to keep its characteristics up to the ratio $$S/N = 10 \log_2 \frac{P_s}{P_N} = (-6 \text{ to } -10) \text{ dB}.$$

So, the presently known noiseless coding systems, e.g., the LDPC coding and turbocoding, permit to come rather closely to the Shannon's threshold. However, its achievement is restrained by the absence of demodulators capable to operate at such low S/N ratios due to the absence of the synchronization, which requires to derive the carrier from signals utilizing such modulation types as QPSK, 8PSK, 16QAM, etc. using a non-linear transformation followed by filtration. The technique for frequency multiplying is such transformation, which technique can be implemented by raising the input signal to the M-th power (to the fourth power for the QPSK, to the eighth power for the PSK, etc.). But in doing so, a noise is raised to the same power. Moreover, a phase ambiguity emerges, too, which deletion requires for adding to the signal being transmitted a relative coding that introduces additional power loss.

Complexity associated with the use of the PSK, QPSK and 8PSK modulation types is obviously demonstrated in the U.S. Pat. No. 6,697,440 (published Feb. 24, 2004) and Japan Laid-out Patent Application No. 2000-032072 (published Jan. 28, 2000).

As noted preciously, the quadrature-amplitude modulation (QAM) is used amongst other modulation technique in the modern communication systems.

Thus, the Japan Laid-out Patent Application No. 2001-237908 (published Aug. 31, 2001) discloses the system for deriving the QAM synchronization signal, which system providing the quasi-synchronous detection. The U.S. Pat. Nos. 6,717,462 (published Apr. 6, 2004) and 6,727,772 (published Apr. 27, 2004) disclose the methods and systems for transmitting and receiving QAM signals with carrier adjustment. However, these both patents provide only the ordinary processing of the QAM signal. The disadvantage of these analogues is the impossibility for lowering the demodulation threshold in order to come near the Shannon's threshold.

SUMMARY OF THE INVENTION

The object of the present invention consists in providing such method and system for transmitting and receiving QAM signals, which permit to lower the demodulation threshold by means of providing a low synchronization threshold on the carrier frequency.

In order to accomplish such a result, provided are a method and system for implementing thereof, both intended for transmitting and receiving QAM signals according to the present invention. The main principle of this invention consists in supplementing the burst of M m-level QAM symbols with the predetermined symbols, which portion does not alter from one burst to another burst, and another portion thereof is inverted periodically in some of bursts. Owing to this, at the receiving side, the QAM signal components corresponding to the predetermined symbols (which frequencies being known) are derived. According to those components, the inversion frequency is determined, which ensures the ambiguity deletion in adjusting the reception synchronization frequency. This provides the possibility to come close to the Shannon threshold.

The aspects and features of the present invention are shown in detail in the appended claims. The detailed description serves for better understanding the claimed group of the inventions.

BRIEF DESCRIPTION OF THE DRAWINGS

The following detailed description is illustrated with drawings, in which the identical or similar elements have the same numerals.

FIGS. 5 to 7 illustrate, respectively, the embodiments of the first to third phase locked-loop frequency control units in the clock-frequency discriminator of the receiving side in the system according to the present invention.

FIG. 8 illustrates the embodiment of the frequency component forming unit of the receiving side in the system according to the present invention.

DETAILED DESCRIPTION OF THE PREFERRED EMBODIMENTS

Figure 1A:
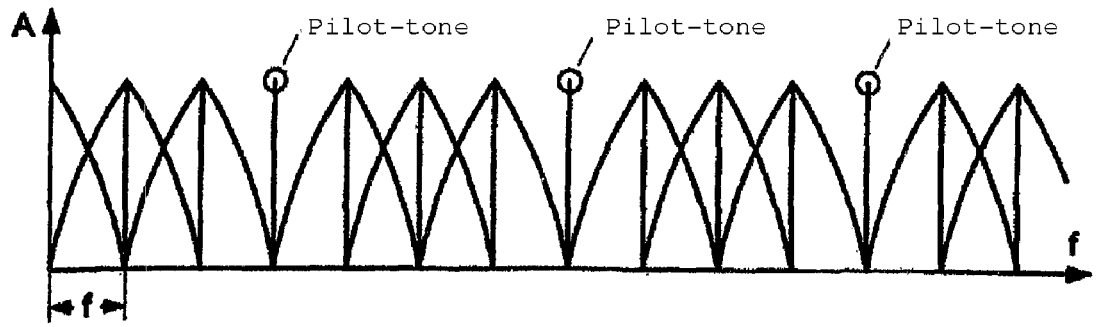
FIG. 1 represents the schematic diagram illustrating a possible signal used in the system according to the present invention.
Figure 1B:
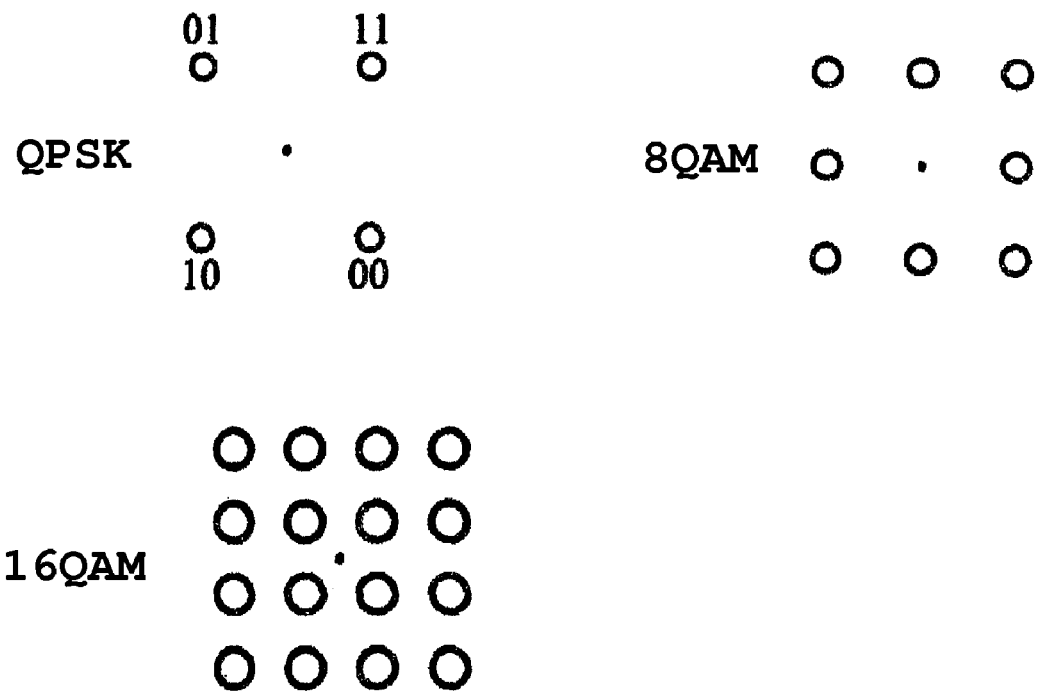

A view of the signal used in the system for transmitting and receiving QAM signals according to the present invention is shown in FIG. 1. The spectrum of this signal in the I channel represents a set of frequency components spaced apart by a predetermined frequency amount and alternated with pilot signals (FIG. 1a). Taking into account the Q channel signal, possible signal constellations for various modulation types have a form shown in FIG. 1b.

The system for transmitting and receiving QAM signals according to the present invention consists generally of transmitting side and receiving side connected with a communication channel.

Figure 2:
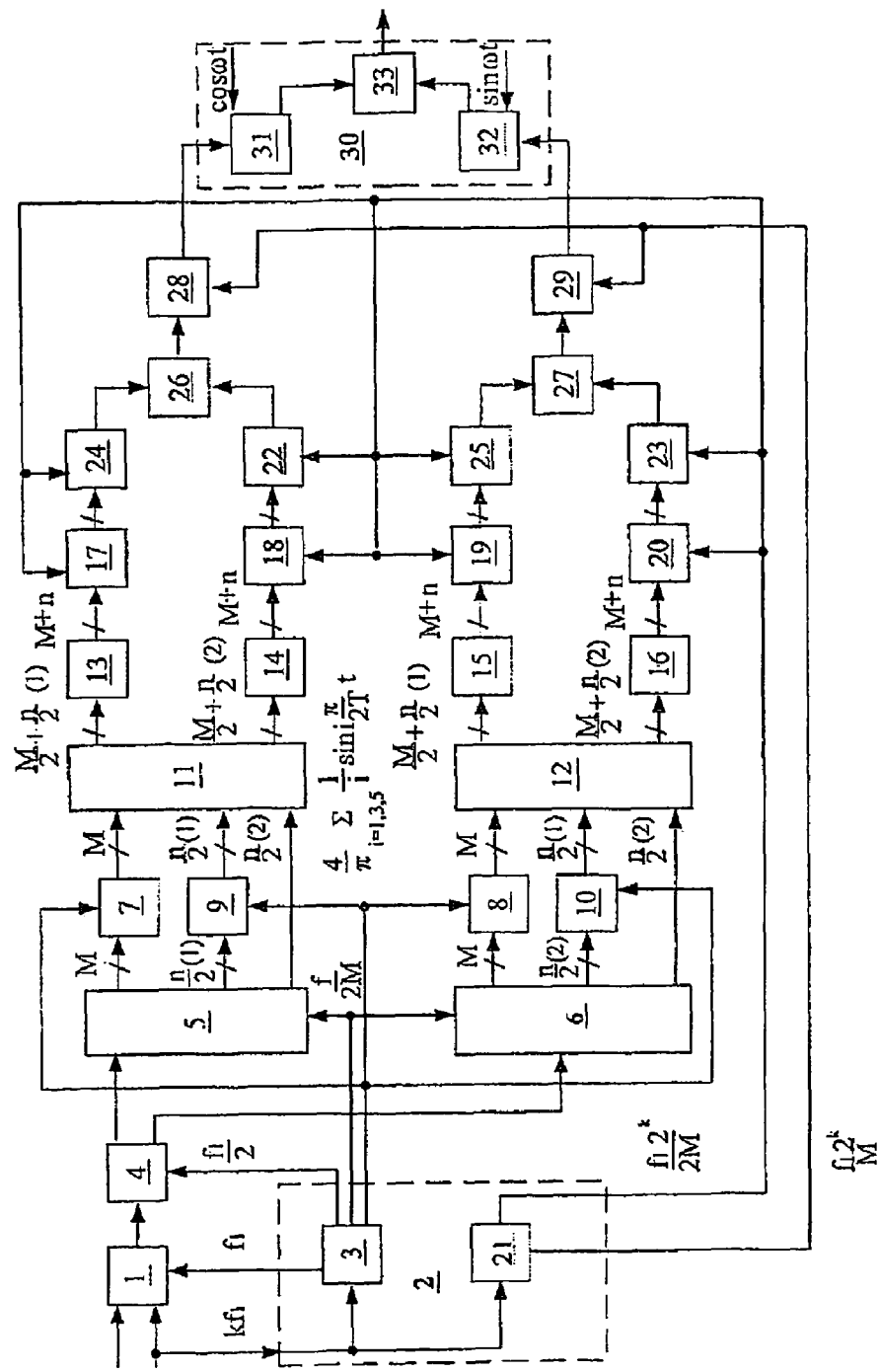
FIG. 2 is the block diagram of the transmitting side in the system for transmitting and receiving QAM signals according to the present invention.

FIG. 2 represents the block diagram of the transmitting side in the system for transmitting and receiving QAM signals according to the present invention.

The transmitting side comprises an m-level symbol former 1 intended for converting an original sequence of bit symbols running with a frequency of $kf_1$ into a sequence of m-level symbols, where $m=2^k$, $k=2, 3, \ldots$, running at the first clock frequency $f_1$. This first clock frequency is produced in a clock-frequency discriminator 2 of the transmitting side at the first output of a frequency dividing unit 3 comprised in the discriminator 2 from a signal of the clock frequency $kf_1$ coming to the input of the unit 3, which accompanies the original bit symbol sequence.

A channel separator 4 is intended for separating the information sequence of the m-level symbols from the former 1 into an I channel of the transmitting side with the even m-level symbols and a Q channel of the transmitting side with the odd m-level symbols. The repetition rate of the m-level symbols in each of the I and Q channel of the transmitting side equal to $f_1/2$ is formed at the second output of the frequency dividing unit 3.

Each of first and second burst formers 5 and 6 is intended for storing bursts of M m-level symbols at the interval $$T = \frac{2 \cdot M}{f_1},$$

where $2^{L-1} < M < 2^L$, L=5, 6, 7, ..., in the respective one of the I and Q channels of the transmitting side, and for supplementing every burst of M m-level symbols with n predetermined symbols to the total number of $M+n=2^L$. A signal with the frequency of 1/T from the third output of the frequency dividing unit 3 is applied to the formers 5, 6.

Each of the I and Q channels of the transmitting side has two multipliers. Each of the first and second multipliers 7 and 8 is intended for inverting values of the m-level symbols in the odd burst pairs in the I and Q channels of transmitting side, respectively. Each of the third and fourth multipliers 9 and 10 is intended for inverting values of a half of the predetermined symbols supplemented to every odd burst pair in the I and Q channels of the transmitting side, respectively. A signal providing such inversion and coming from the fourth output of the frequency dividing unit 3 has a form:

$$\frac{4}{\pi} \sum_{i=1,3,5,...}^{\infty} \frac{1}{i} \sin i \frac{\pi}{2T} t,$$

i.e., is a meander with values +1 and −1 and a frequency of ¼T.

Each of third and fourth burst formers 11 and 12 is intended for separating every burst of M+n symbols in two in the respective one of the I and Q channels of the transmitting side.

A first to fourth inverse Fourier transform (IFT) units 13-16 are intended for replacing every burst of $$\frac{M+n}{2}$$

symbols with a set of M+n time samples using the IFT.

A first to fourth parallel-to-serial converters 17-20 are intended for converting, in each of the I and Q channels of the transmitting side, each of the set of M+n time samples received from the IFT units 13-16, respectively, into a correspondent sequence of M+n time samples with the second clock frequency $$f_2 = \frac{f_1 \cdot 2^k}{2M} = \frac{2^k}{T}.$$

The signal of this frequency is formed in the clock-frequency discriminator 2 from the first output of a frequency multiplying unit 21 which input is fed with the clock frequency $kf_1$ of the original bit symbol sequence.

Each of first and second Hilbert transform units 22, 23 is intended for shifting a phase by $\pi/2$ for all frequencies of the spectrum of the respective sequence from M+n time samples in the I and Q channels of the transmitting side, respectively. Each of first and second delay units 24, 25 is intended for delaying another one of the sequences from M+n time samples in the I and Q channels of the transmitting side, respectively, for the time of processing in the respective Hilbert transform unit 22, 23.

Each of first and second sample-to-sample adders 26 and 27 is intended for combining, in the respective one of the I and Q channels of the transmitting side, the both sequences from M+n time samples obtained from the similarly named Hilbert transform unit 22, 23 and similarly named delay unit 24, 25 into a single sequence of the same length.

Each of first and second filter units 28 and 29 is intended for filtering the combined sequence from the similarly named sample-to-sample adders 26 and 27, respectively. This filtration is carried out with the second clock frequency $f_2$ from the frequency multiplying unit 21 in the range of 0 to $f_2/2$ in the respective one of the I and Q channels of the transmitting side.

A waveform shaper 30 for transmission is intended for forming a signal for transmission from the filtered sequences from the units 28, 29 in the I and Q channels of the transmitting side. In the shaper 30, a first and second multipliers 31, 32 perform the step of multiplying the filtered sequences by the cosine and sine carrier signals and adding the results of that multiplication in an adding unit 33. An output signal of the adding unit 33 in the shaper 30 is fed to a communication channel (not shown).

Figure 3:
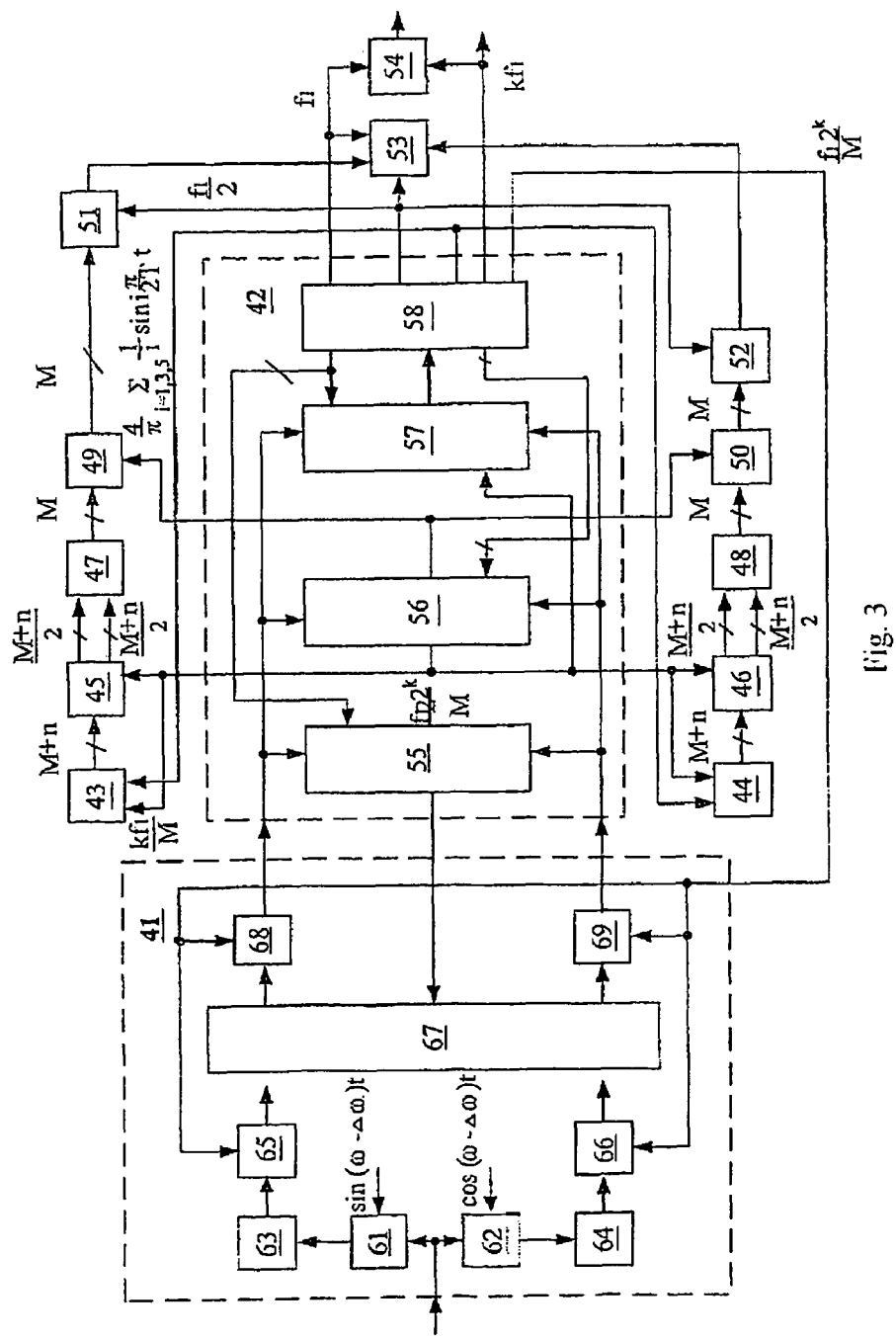
FIG. 3 is the block diagram of the receiving side in the system for transmitting and receiving QAM signals according to the present invention.

FIG. 3 shows the block diagram of the receiving side in the system for transmitting and receiving QAM signals according to the present invention.

The receiving side, which input is connected to the communication channel, comprises amplifying, filtering and intermediate-frequency down-converting means common for every receiver, which are not shown in FIG. 3 but supposed to be in presence. Further, the receiving side comprises a quadrature conversion unit 41 intended for separating the signal being received into digital sample sequences in the I channel of the receiving side and in the Q channel of the receiving side. The receiving side includes a clock-frequency discriminator 42 intended for extracting clock frequencies using signals in the I and Q channels of the receiving side. The implementation of the clock-frequency discriminator 42 will be set forth below.

Each of first and second buffer units 43 and 44 is intended for dividing the digital sample sequences in the respective one of the I and Q channels of the receiving side into bursts of M+n samples and for storing those bursts.

Each of first and second Fourier transform (DFT) units 45 and 46 is intended for performing, in the respective one of the I and Q channels of the receiving side, the DFT on the bursts of M+n samples and for obtaining pairs of $$\frac{M+n}{2}$$

m-level samples.

Each of first and second sample extractors 47 and 48 is intended for extracting M m-level samples from each pair of $$\frac{M+n}{2}$$

m-level samples in the respective one of the I and Q channels of the receiving side. These M samples correspond with those samples that came to the transmitting side input.

Each of first and second phase ambiguity elimination units 49 and 50 is intended for eliminating a phase ambiguity of the respective one of the I and Q channels of the receiving side. Each of first and second converters 51 and 52 to m-level sequence is intended for forming sequences of m-level samples in the respective one of the I and Q channels of the receiving side from the signals at the output of the similarly named phase ambiguity elimination unit 49 and 50. A sequence combining unit 53 is intended for combining the sequences of m-level samples from the similarly named converters 51 and 52 of the I and Q channels of the receiving side into one sequence of m-level samples running at the first clock frequency $f_1$.

A converter 54 to binary sequence is intended for converting the combined sequence of m-level samples from the sequence combining unit 53 into an information sequence of bit symbols with the clock frequency $kf_1$.

The clock-frequency discriminator 42 comprises (FIG. 3) first to third phase-locked-loop (PLL) units 55-57, which first and second inputs are intended for receiving signal of the I and Q channels of the receiving side, respectively, the output of the first PLL unit 55 is intended for producing an intermediate frequency adjusting signal fed to the quadrature conversion unit 41. The first and second outputs of the second PLL unit 56 are intended, respectively, for producing a signal with the frequency $$\frac{kf_1}{M}$$

fed to the first and third PLL units 55, 57, first and second buffer units 43, 44, and first and second DFT units 45, 46, and a meander signal of interval frequency fed to the first and second phase ambiguity elimination units 49 and 50. The output of the third PLL unit 57 is intended for producing a clock frequency adjusting signal to a frequency component forming unit 58, which first group outputs are connected to respective inputs of the group of inputs of the first and third PLL units 55, 57, and second group outputs are connected to respective group of inputs of the second PLL unit 56. The first output of the frequency component forming unit 58 is intended for producing signals with the frequency $$\frac{f_1 2^k}{M}$$

to the quadrature conversion unit 41, the second output of the frequency component forming unit 58 is intended for producing signals with the second clock frequency $$\frac{f_1 2^k}{2M}$$

to the first and second buffer units 43, 44, the third output of the frequency component forming unit 58 is intended for producing signals with the frequency $kf_1$ to the converter 54 to binary sequence, the fourth output of the frequency component forming unit 58 is intended for producing signals with the first clock frequency $f_1$ to the sequence combining unit 53 and to the converter 54 to binary sequence, the fifth output of the frequency component forming unit 58 is intended for producing signals with the frequency $f_1/2$ to the first and second converters 51 and 52 to m-level sequence and to the sequence combining unit 53.

The quadrature conversion unit 41 at the receiving side comprises (FIG. 3): a seventh and eighth multipliers 61 and 62, each of which is intended for multiplying an input signal by a respective quadrature component with the frequency $$\frac{\omega_{IF} - \Delta\omega}{2\pi},$$

where $$\frac{\Delta\omega}{2\pi}$$

is a frequency of approximate mismatch from the intermediate frequency $$\frac{\omega_{IF}}{2\pi};$$

a first and second filters 63 and 64, each of which is intended for extracting sine and cosine components of the signal being received, respectively; a first and second analog-to-digital (AD) converters 65 and 66, each of which is intended for converting a respective component of the signal being received to digital samples with the frequency $$\frac{f_1 2^k}{M};$$

a digital quadrature demodulator 67 intended for demodulating signals of in-phase (I) and quadrature (Q) channels using the intermediate frequency adjusting signal from the first PLL unit 55 in the clock-frequency discriminator 42; a first and second optimal digital filters 68 and 69 intended for making the optimal digital filtration of the demodulated signals of the in-phase and quadrature channel, respectively, with the frequency $$\frac{f_1 2^k}{M}.$$

The outputs of the first and second digital filters 68 and 69 are outputs of the I channel and Q channel of the receiving side, respectively.

Figure 4:
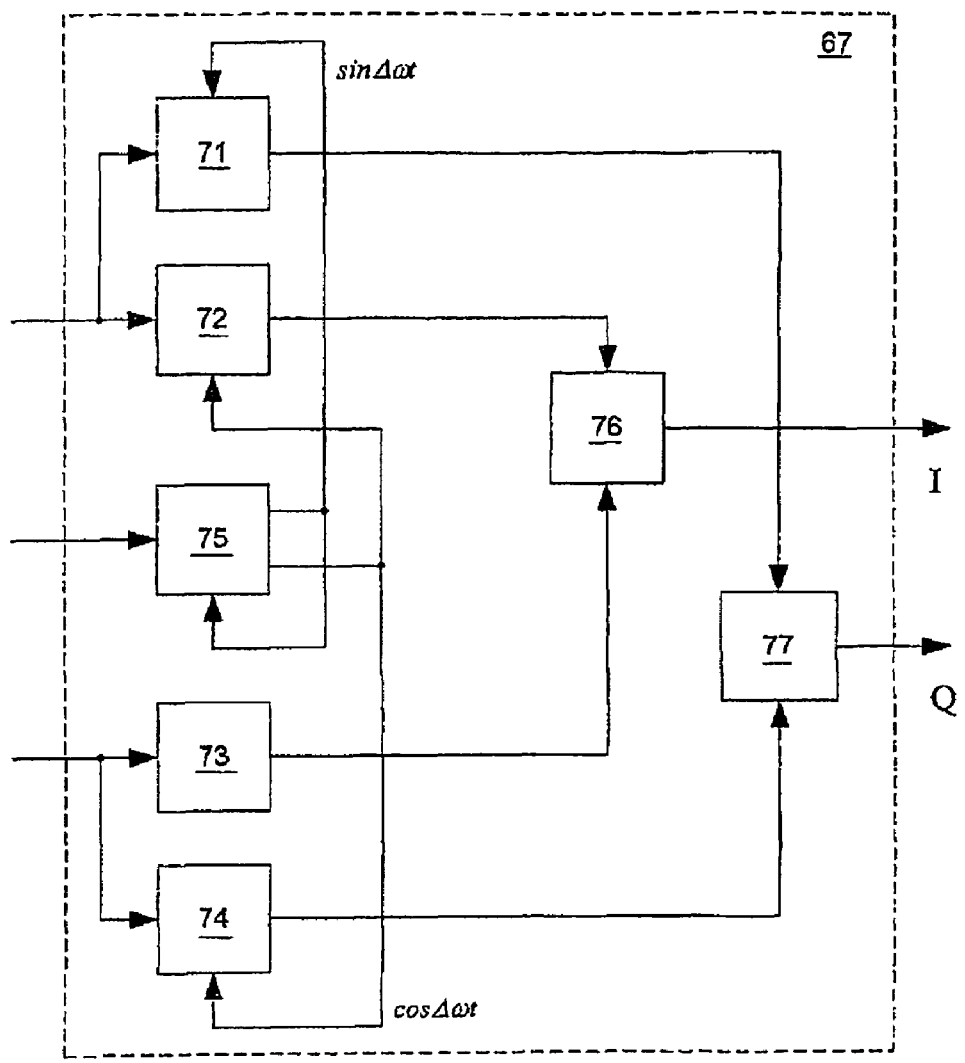
FIG. 4 illustrates the embodiment of the quadrature demodulator in the quadrature conversion unit of the receiving side in the system according to the present invention.

The digital quadrature demodulator 67 being a part of the quadrature conversion unit 41 comprises (FIG. 4): a ninth and tenth multipliers 71 and 72, each of which is intended for multiplying the sine component of the input signal by the respective quadrature component of the frequency $$\frac{\Delta\omega}{2\pi};$$

an eleventh and twelfth multipliers 73 and 74, each of which is intended for multiplying the cosine component of the input signal by the respective quadrature component of the frequency $$\frac{\Delta\omega}{2\pi};$$

a first controlled frequency synthesizer 75 for forming, from the intermediate frequency adjusting signal (from the output of the first PLL 55 unit), the sine component of the signal with the frequency $$\frac{\Delta\omega}{2\pi}$$

for feeding to the ninth and eleventh multipliers 71 and 73 and the cosine component of the signal with the frequency $$\frac{\Delta\omega}{2\pi}$$

for feeding to the tenth and twelfth multipliers 72 and 74; a first subtracter 76 intended for determining a difference of the signals from the tenth and eleventh multipliers 72, 73; a first summer 77 intended for summing the signals from the ninth and twelfth multipliers 71, 74. The outputs of the first subtracter 76 and first summer 77 are outputs of the I channel and Q channel of the quadrature conversion unit 41, respectively.

FIG. 5 to 7 shows possible embodiments of the first to third phase-locked-loop (PLL) units being a part of the clock-frequency discriminator 42 of the receiving side.

The first PLL unit 55 comprises (FIG. 5): a second subtracter 101, intended for determining a difference of the signals of the in-phase and quadrature channels with the respective outputs of the quadrature conversion unit 41; a first group of multipliers 102 to 104 intended for multiplying the difference signal from the second subtracter 101 by the respective cosine components $\cos\Omega_1 t, \cos\Omega_2 t, \ldots \cos\Omega_{n/2} t$ described below; a second summer 105 intended for summing the multiplication results from the outputs of the multipliers 102 to 104; a first low-pass filter (LPF) 106 intended for extracting the low-frequency components of the sum signal from the second summer 105; a thirteenth multiplier 107 intended for multiplying the signal filtered in the LPF 106 by the signal with the frequency $$\frac{f_1}{M};$$

a first loop filter 108 intended for filtering the signal from the output of the thirteenth multiplier 107 and extracting the intermediate frequency adjusting signal. (the name "loop" stresses the fact that this filter is arranged in the phase locked loop.) The output of the first loop filter 108 is the first output of the first PLL unit 55.

The second PLL unit 56 comprises (FIG. 6): a third summer 111, intended for summing the signals of the in-phase and quadrature channels from the respective outputs of the quadrature conversion unit 41; a second group of multipliers 112 to 114 intended for multiplying the sum signal from the third summer 111 by the respective sine components $\sin\Omega_1 t, \sin\Omega_2 t, \ldots \sin\Omega_{n/2} t$ described below; a fourth summer 115 intended for summing the multiplication results from the outputs of the multipliers 112-114 of the second group; a second LPF 116 intended for extracting low-frequency components of the sum signal from the fourth summer 115; a fourteenth multiplier 117 intended for multiplying the signal filtered in the second LPF 116 by the signal described below; a second loop filter 118 intended for filtering the signal from the output of the fourteenth multiplier 117; a second controlled frequency synthesizer 119 intended for forming, at its first output, a signal to the fourteenth multiplier 117, and at its second output, a meander signal of the form of $$\frac{4}{\pi}\sum_{i=1,3,5,\ldots}^{\infty}\frac{1}{i}\sin i\frac{\pi}{2T}t;$$

a first frequency former 120 intended for forming a signal of the frequency $$\frac{f_1}{M}$$

from said meander signal from the second output of the second controlled frequency synthesizer 119. The output of the first frequency former 120 and the second output of the second controlled frequency synthesizer 119 are the first and the second outputs of the second PLL unit 56, respectively.

The third PLL unit 57 comprises (FIG. 7): a fifth summer 121 intended for summing the signals of the in-phase and quadrature channels from the respective outputs of the quadrature conversion unit 41; a third group of multipliers 122-124 intended for multiplying the sum signal from the fifth summer 121 by the respective cosine components $\cos\Omega_1 t, \cos\Omega_2 t, \ldots \cos\Omega_{n/2} t$ described below; a sixth summer 125 intended for summing the multiplication results from the outputs of the multipliers 122-124 of the third group; a third LPF 126 intended for extracting low-frequency components of the signal from the sixth summer 125; a fifteenth multiplier 127 intended for multiplying the signal filtered in the third filter 126 by the signal of the frequency $$\frac{f_1}{M};$$

a third loop filter 128 intended for filtering the signal from the output of the fifteenth multiplier 127 and extracting the clock frequency adjusting signal. The output of the third loop filter 128 is the output of the PLL unit 156.

The frequency component forming unit 58 comprises (FIG. 8): a third controlled frequency synthesizer 131 intended for receiving the clock frequency adjusting signal from the third PLL unit 57 and for forming the signal of the third clock frequency of the receiving side; a second frequency former 132 intended for forming a signal with the frequency $$\frac{f_1 2^k}{M}$$

from the signal of the third controlled frequency synthesizer 131; a group of cosine component formers 133-135, each of which is intended for forming a respective one of cosine components $\cos\Omega_1 t$, $\cos\Omega_2 t$, ... $\cos\Omega_{n/2} t$ described below; a group of sine component formers 136-138, each of which is intended for forming a respective one of sine components $\sin\Omega_1 t$, $\sin\Omega_2 t$, ... $\sin\Omega_{n/2} t$ described below; a phase-locked-loop (PLL) circuit 139 intended for adjusting the frequency of signal described below in accordance with the signal from the second frequency former 132; a fourth controlled frequency synthesizer 140 intended for forming a signal with a frequency adjusted by the PLL circuit 139; a third frequency former 141 intended for forming a signal with the frequency $$\frac{f_1 2^k}{2M}$$

from the signal of the second frequency former 132; a fourth frequency former 142 intended for forming a signal with the frequency $kf_1$ from the signal of the fourth controlled frequency synthesizer 140; a fifth frequency former 143 intended for forming a signal with the frequency $f_1$ from the signal of the fourth controlled frequency synthesizer 140; a sixth frequency former 144 intended for forming a signal with the frequency $f_1/2$ from the signal of the fourth controlled frequency synthesizer 140. The outputs of the group of the cosine component formers 136-138 are, respectively, the first output group and the second output group of the fourth frequency component forming unit 58. The outputs of the second to sixth frequency formers 132, 141-144 are, respectively, the first-fifth outputs of the frequency component forming unit 58.

The method for transmitting and receiving QAM signals according to the present invention is implemented in the shown system as follows.

An initial bit sequence with the frequency $kf_1$ comes to the information input of the m-level symbol former 1 (FIG. 2) that converts this bit (i.e., binary) sequence to the m-level symbol sequence, where $m=2^k$, $k=2, 3, \ldots$, which symbols running with the first clock frequency $f_1$. In principle, the former 1 is not required in the case, when the initial sequence is just the m-level symbol sequence. The first clock frequency is generated in the clock-frequency discriminator 2 of the transmitting side at the first output of the frequency dividing unit 3 included therein from the signal of the clock frequency $kf_1$ coming to its input. In the case when the initial sequence is the m-level symbol sequence, the first clock frequency $f_1$ comes directly from the input. Then, in the clock-frequency discriminator 2, an additional frequency multiplication in the frequency multiplying unit 21 should be involved, or a respective frequency multiplier should be added prior to the unit 21.

The obtained sequence of m-level symbols from the former 1 comes to the channel separator 4, where this sequence is separated into the I channel of the transmitting side having even m-level symbols and the Q channel of the transmitting side having odd m-level symbols. The repetition rate of the m-level symbols in each of the I and Q channels of the transmitting side is $f_1/2$. The respective clock signal is formed at the second output of the frequency dividing unit 3 in the clock-frequency discriminator 2.

In the I channel of the transmitting side, the even m-level symbols come to the first burst former 5, where the even m-level symbols from one output of the channel separator 4 are stored in the form of bursts of M m-level symbols at the interval $$T = \frac{2\cdot M}{f_1},$$

where $2^{L-1}<M<2^L$, $L=5, 6, 7, \ldots$ Similarly, in the Q channel of the transmitting side, the odd m-level symbols come to the second burst former 6, where the odd m-level symbols from another output of the separator 4 are stored in the form of similar burst of M m-level symbols at the same interval T. Moreover, in each of the burst former 5 and 6, every formed burst of M m-level symbols is supplemented up to the total number of $M+n=2^L$. Note that the burst former 5, 6 are clocked by the signal with the frequency 1/T, i.e., $$\frac{f_1}{2\cdot M},$$

from the third output of the frequency dividing unit 3 in the clock-frequency discriminator 2.

In each of the I and Q channels, all values of the m-level symbols in the odd burst pairs are inverted, respectively, in the first and second multipliers. One half of the predetermined symbols supplemented to every odd burst pair in each of the burst formers 5 and 6 is also inverted in the third and fourth multipliers 9 and 10, respectively. This inversion is provided by multiplying all values coming to the multipliers 7-10 by the meander signal $$\frac{4}{\pi}\sum_{i=1,3,5,\ldots}^{\infty}\frac{1}{i}\sin i\frac{\pi}{2T}t$$

having the values of +1 and −1 with the frequency ¼T fed from the fourth output of the frequency dividing unit 3 in the clock-frequency discriminator 2. Note that the second half of values of the predetermined symbols supplemented to every burst in each of the burst formers 5 and 6 in the I and Q channels of the transmitting side is not subjected to the inversion.

Every burst of M m-level symbols, whether it is inverted or not, along with all n predetermined vales supplemented thereto, which one half ( $$\frac{n}{2}(1)$$

in FIG. 2) could be inverted and another half ( $$\frac{n}{2}(2)$$

in FIG. 2) without inversion, comes to the third and fourth burst formers 11 and 12 in the respective one of the I and Q channels of the transmitting side. Each of these burst formers 11 and 12 is intended for separating every burst of M m-level symbols into halves and for outputting the both halves in parallel at its respective output.

Every "semi-burst" of $$\frac{M+n}{2}$$

m-level symbols comes to one of the first-fourth inverse Fourier transform (IFT) units 13-16, where every burst of $$\frac{M+n}{2}$$

symbols is replaced with a set of M+n time samples using the IFT.

The sets of M+n time samples from the outputs of the first-fourth IFT units 13-16 come in parallel to the inputs of the similarly named parallel-to-serial converters 17-20. Each of these converters 17-20 is intended for converting, in each of the I and Q channels of the transmitting side, a parallel set of M+n time samples to a respective sequence of M+n time samples with the second clock frequency $$f_2 = \frac{f_1 \cdot 2^k}{2M} = \frac{2^k}{T}.$$

The signal of this frequency is output from the fifth output of the clock-frequency discriminator 2, where this signal is produced from the first output of the frequency multiplying unit 21, which input is fed with the clock frequency $kf_1$ of the initial bit symbol sequence.

Further, a step of turning the phase of all spectrum frequencies of one of two sequences of M+n time samples in each of the I and Q channels of the transmitting side by π/2 is provided (which step if the Hilbert transform in this case). This step is performed by the first and second Hilbert transform units 22, 23 in the I and Q channels of the transmitting side, respectively. Another sequence of M+n time samples in each of the I and Q channels of the transmitting side is delayed by the first and second delay units 24, 25, respectively, for the processing time in the respective Hilbert transform unit 22, 23.

Both sequences of M+n time samples obtained thereafter, with the turned phases and the delayed one, in each of the I and Q channels of the transmitting side come to the respective inputs of the first (in the I channel) and second (in the Q channel) sample-to-sample adder 26 and 27, where the sample-to-sample combining of these sequences of M+n time samples from the similarly named Hilbert transform unit 22, 23 and the similarly named delay unit 24, 25 to a single sequence of the same length takes place.

The obtained combined sequences in each of the I and Q channels of the transmitting side are filtered by the first and second filter units 28 and 29, respectively. This filtration is performed with the second clock frequency $f_2$ produced from the sixth output of the clock-frequency discriminator 2 (from the second output of the frequency multiplying unit 21) in the range of 0 to $f_2/2$ in the respective one of the I and Q channels of the transmitting side.

Finally, the obtained filtered signal in each of the I and Q channels of the transmitting side comes to the waveform shaper 30 for transmission. In the waveform shaper 30, the fifth and sixth multipliers 31, 32 perform the steps of multiplying the filtered sequences by the cosine and sine carrier signals and adding the results of this multiplication in the adding unit 33. The signal from the output of the adding unit 33 in the shaper 30 comes to the communication channel (not shown in FIG. 2).

After passing the communication channel, the signal being transmitted comes to the receiving side (FIG. 3). After passing the amplifying, filtering and intermediate-frequency down-converting means common for every receiver (not shown in FIG. 3), the received signal comes to the quadrature conversion unit 41. In this unit 41, the received signal of the intermediate frequency $$\frac{\omega_{IF}}{2\pi}$$

comes to the inputs of the seventh and eighth multipliers 61 and 62, each of which multiplies the input signal by the cosine or sine component of the frequency $$\frac{\omega_{IF} - \Delta\omega}{2\pi},$$

where $$\frac{\Delta\omega}{2\pi}$$

is the approximate mismatch from the intermediate frequency $$\frac{\omega_{IF}}{2\pi}.$$

The thus obtained signals are filtered in the first and second filters 63 and 64, respectively, each extracting the sine and cosine components of the received signal, respectively.

These extracted components are the analogue signals that are fed, respectively, to the first and second analog-to-digital (A/D) converters 65 and 66 converting the respective components of the signal being received to digital samples with the frequency $$\frac{f_1 2^k}{M}$$

coming from the first output of the clock-frequency discriminator 42. The digitized samples from the both A/D converters 65 and 66 are fed to the respective inputs of the digital quadrature demodulator 67 which also receives the intermediate frequency adjusting signal from the first PLL unit 55 in the clock-frequency discriminator 42.

In the digital quadrature demodulator 67 (see FIG. 4), each of the digital sample sequences comes to the united inputs of the ninth (71), tenth (72), and eleventh (73), twelfth (74) multipliers. The intermediate frequency adjusting signal is fed to the controlled frequency synthesizer 75 forming at its output the sine and cosine components of the frequency $$\frac{\Delta\omega}{2\pi}.$$

The signals from the ninth and twelfth multipliers 71, 74 are fed to the summer 77, and the signals from the tenth and eleventh multipliers 72, 73 are fed to the first subtracter 76. As a result, the output signals of quadrature demodulator 67 are produced at the outputs of the first subtracter and first summer. These signals (see FIG. 3) are passed through the first and second optimum digital filters 68 and 69, respectively, which provide the optimal digital filtration with the frequency $$\frac{f_1 2^k}{M}$$

obtained from the first output of the frequency component forming unit 58 in the clock-frequency discriminator 42. The output signals of the digital quadrature demodulator 67 for the I and Q channels of the receiving side, respectively, are produced at the outputs of the first and second digital filters 68 and 69, respectively.

The signals obtained at the outputs of the digital quadrature demodulator 67 are fed to the clock-frequency discriminator 42, which operation id explained below, and to the inputs of the first (in the I channel of the receiving side) and second (in the Q channel of the receiving side) buffer units 42 and 44. Each of these buffer units 43, 44 separates the digital sample sequence coming thereto in its channel (I or Q) of the receiving side into the bursts of M+n samples and stores these sample bursts. The frequencies $$\frac{kf_1}{M}$$

and $$\frac{f_1 2^k}{2M}$$

necessary for the buffer unit operation are fed, respectively, from the second output of the frequency component forming unit 58 and from the output of the second PLL unit 56 in the clock-frequency discriminator 42.

From the buffer units 43, 44, the signals are fed, respectively, to the first and second direct Fourier transform (DFT) units 45 and 46, where the direct Fourier transform is carried out on the bursts of M+n samples, which results in producing the burst pairs of $$\frac{M+n}{2}$$

m-level samples in the respective one of the I and Q channels of the receiving side. The signal of the frequency $$\frac{f_1 2^k}{2M}$$

is produced from the first output of the second PLL unit 56 in the clock-frequency discriminator 42.

In the first and second sample extractors 47 and 48, every burst pair of $$\frac{M+n}{2}$$

m-level samples in the respective one of the I and Q channels of the receiving side is converted to the burst of M m-level samples. These M samples corresponds to those samples that were come to the transmitting side input.

The obtained bursts of M m-level samples in each of the I and Q channels of the receiving side come to the first and second phase ambiguity elimination units 49 and 50, respectively. Each of these units 49 and 50 performs the phase ambiguity elimination in the signal of the respective one of the I and Q channels of the receiving side. This ambiguity elimination is performed by means of multiplying the bursts by the meander signal $$\frac{4}{\pi} \sum_{i=1,3,5,\ldots}^{\infty} \frac{1}{i} \sin i \frac{\pi}{2T} t$$

obtained from the second output of the second PLL unit 56 in the clock-frequency discriminator 42.

Bursts of M m-level samples with the eliminated phase ambiguity in each of the I and Q channels of the receiving side are fed in parallel to the first and second converters 51 and 52 to m-level sequence, where the sequences of m-level samples are formed in the respective one of the I and Q channels of the receiving side using the signals of the frequency $f_1/2$ from the fifth output of the frequency component forming unit 58.

The thus obtained sequences of m-level samples are combined in the sequence combining unit 53. The obtained sequence of m-level samples runs with the clock frequency $f_1$ produced from the fourth output of the frequency component forming unit 58 in the clock-frequency discriminator 42.

The converter 54 to binary sequence is intended for converting the combined sequence of m-level samples from the sequence combining unit 53 into an information sequence of bit symbols with the clock frequency $kf_1$ in the clock-frequency discriminator 42. However, it is possible that in some applications, the sequence from the sequence combining unit 53 will be the output sequence. Then, in the diagram of the frequency component forming unit 58 in the clock-frequency discriminator 42 of the receiving side (FIG. 8) the fourth frequency former 142 could be omitted.

Refer now to the operation of the clock-frequency discriminator 42 (FIG. 3). As mentioned above, the output signals of the quadrature conversion unit 41 come to the respective inputs of the first to third PLL units 55-57, where signals needed for normal signal reception are extracted from those signal from the unit 41.

In the first PLL unit 55 (FIG. 5), the signals from the output of the quadrature conversion unit 41 (signals of the I and Q channels of the receiving side) come to the inputs of the second subtracter 101. From its output, the difference signal is fed to the group of multipliers 102-104, to another input of each of which is fed the respective one of the cosine components $\cos \Omega_1 t$, $\cos \Omega_2 t$, . . . $\cos \Omega_{n/2} t$, which obtaining is described below. All results of these multiplications are fed to the second summer 105, which output signal is filtered in the LPF 106 and comes to the thirteenth multiplier 107, to which another input comes the signal with the frequency $$\frac{kf_1}{M}$$

from the first output of the second PLL unit 56. The result of the multiplication in the thirteenth multiplier 107 through the loop filter 108 is fed from the output of the first PLL unit 55 to the input of the controlled frequency synthesizer 75 in the digital quadrature demodulator 67.

The third PLL unit 57 (FIG. 7) operates on the same principle except for that the signals from the outputs of the quadrature conversion unit 41 (signals of the I and Q channels of the receiving side) come to the inputs of the fifth summer 121 (rather than the subtracter 101 as in the first PLL unit 55). The output signal of the third PLL unit 57 is fed to the input of the frequency component forming unit 58 which operation is described below.

In the second PLL unit 56 (FIG. 6), units 111-118 operate similar to the respective units 121-128 of the third PLL unit 57 except for that sine (rather cosine) components $\sin \Omega_1 t$, $\sin \Omega_2 t$, ... $\sin \Omega_{n/2} t$, which obtaining is described below, are fed to group of the multipliers 112-114 (similar to the multipliers 122-124 of the third PLL unit 57). However, the signal from the output of the loop filter 118 is fed to the second controlled frequency synthesizer 119 rather than to the output of the unit 56, and the signal from the first output of said synthesized 119 is fed to the fourteenth multiplier 117 (instead of the signal with the frequency $$\frac{kf_1}{M},$$

as in the third PLL unit 57). From the second output of the controlled frequency synthesizer 119, the $$\text{signal } \frac{4}{\pi} \sum_{i=1,3,5,\ldots}^{\infty} \frac{1}{i} \sin i \frac{\pi}{2T} t$$

comes to the second output of the second PLL unit 56 and to the first frequency former 120, from which output is just output the signal with the frequency $$\frac{kf_1}{M}$$

at the first output of the second PLL unit 56.

The signal from the third PLL unit 57, as mentioned above, is fed to the input of the frequency component forming unit 58, wherein this signal comes to the input of the third controlled frequency synthesizer 131, which output signal is fed to the input of the second frequency former 132. From the second frequency former 132, the signal with the frequency $$\frac{f_1 2^k}{M}$$

is fed to the first output of the frequency component forming unit 58 to the input of the PLL circuit 139 and to the input of the fourth frequency former 141, as well as to the inputs of the group of the cosine component formers 133-135 and to the inputs of the group of the sine components formers 136-139.

The formers 133-135 of one group provide for forming the cosine components $\cos \Omega_1 t$, $\cos \Omega_2 t$, ... $\cos \Omega_{n/2} t$, the frequency $\Omega_i$ value of each of which is determined by the position of those from n predetermined symbols in every burst of M+n symbols at the transmitting side, which values are not inverted from one burst to another ( $$\frac{n}{2}(2)$$

in FIG. 2). The formers 136-138 of another group provide for forming the sine components $\sin \Omega_1 t$, $\sin \Omega_2 t$, ... $\sin \Omega_{n/2} t$, the frequency $\Omega_i$ value of each of which is determined by the position of those from n predetermined symbols in every burst of M+n symbols at the transmitting side, which values are just inverted from one burst to another ( $$\frac{n}{2}(1)$$

in FIG. 2.) Remind that the frequency $\Omega_i$ values are set in advance and known at both the transmitting side and receiving side. That is why it is possible to provide for the phase ambiguity elimination in the signal being received. The signals obtained in the frequency formers 133-135 of one group are fed to the first and third PLL units 55, 57, and the signals from the frequency formers 136-138 of another group are fed to the second PLL unit 56

The signal from the second frequency former 132 comes, as mentioned, also to the third frequency former 141, at which output the signal with the frequency $$\frac{f_1 2^k}{2M}$$

is obtained, and to the PLL circuit 139. The circuit provides for a constant adjustment of the frequency of the fourth controlled frequency synthesizer 140 to the frequency $$\frac{f_1 2^k}{M}$$

from the second frequency former 132. The output signal of the fourth controlled frequency synthesizer 140 is used in the fourth to sixth frequency formers 142-144 for forming signals with the frequency, respectively, $kf_1$, $f_1$ (the first clock frequency), and $f_1/2$.

It can be appreciated by those skilled in the art that all operations of the method for transmitting and receiving QAM signals according to the present invention can be implemented not only in a hardware form but also in a software form, since the processed signal is already sampled, digitized, and transferred to the bit sample form. These samples will be processed in the computer processor in accordance with the program which algorithm was in fact described above. In this case, the program, corresponding to the implementation of the above functioning algorithm, by which program implementation in the computer it is possible to implement the method according to the present invention, could be recorded to the computer-readable medium intended for the direct operation as a part of the computer.

Moreover, the method according to the present invention could be expediently applied for only synchronizing the reception of the quadrature modulation signals at the interval $$T = \frac{2kM}{f_1},$$

rather than for transmitting messages using QAM signals. In this case, it is sufficient to have, in the signal being transmitted, those components that correspond to the supplementary n predetermined symbols introduced in the burst formers 5 and 6.

Therefore, all indicated possibilities are included in the form of individual aspects in the appended claims that fully defines the scope of the present invention taking into account all equivalents of the features used in this claims. The description serves only for the purpose of illustrating and explaining the principles rather than limiting the scope of the present invention.

What is claimed is:

1. A method for transmitting and receiving quadrature amplitude modulation (QAM) signals, the method including steps of:

at the transmitting side:
a) dividing the information sequence of m-level symbols, where m $=2^k$, k $=1, 2, 3 \ldots$ running with the first clock frequency $f_1$, into an I channel of the transmitting side with the even m-level symbols and Q channel of the transmitting side with the odd m-level symbols, the m-level symbols in each of the I and Q cannels of the transmitting side running with the frequency $f_1/2$;
b) in each of the I and Q channels of the transmitting side, forming bursts of M m-level symbols at the interval $$T = \frac{2 \cdot M}{f_1},$$

where $2^{L-1}$<M <$2^L$, L =5, 6, 7, . . ., and inverting the values of m-level symbols in the odd burst pairs;
c) supplementing every burst of M m-level symbols with n predetermined symbols to the total number of M+n $=2^L$ and inverting the values of the half of said predetermined symbols supplemented to the bursts of every odd burst pair;
d) in each of the I and Q channels of the transmitting side, dividing every burst of M+n symbols in halves and replacing every burst of $$\frac{M+n}{2}$$

symbols with a set of M+n time samples using the conversion from M+n frequency domain to the time domain;
e) in each of the I and Q channels of the transmitting side, converting each of said sets of M+n time samples obtained from one of said bursts of M+n symbols to the respective sequence of M+n time samples with the second clock frequency $$f_2 = \frac{f_1 \cdot 2^k}{2M} = \frac{2^k}{T};$$

f) in each of the I and Q channels of the transmitting side, combining both obtained sequences of M +n time samples into one sequence of the same length, for which purpose all spectrum frequencies of one of the sequences being combined are phase turned by π/2, and adding, on sample-to-sample basis, the both sequences;
g) in each of the I and Q channels of the transmitting side, filtering the combined sequence with the second clock frequency $f_2$ in the range of 0 to $f_2/2$;
h) forming a signal for transmission using said filtered sequences;
at the receiving side:
i) separating the signal being received into a signal of the I channel of the receiving side and a signal of the Q channel of the receiving side using a double quadrature conversion and digital filtration;
j) deriving, using the sum signal of the I and Q channels of the receiving side, the second clock frequency $f_2$ and, on the basis thereof, the first clock frequency, using for deriving the second clock frequency those frequency components in the spectra of the signal of said I and Q channels of the receiving side, the frequency $\Omega_i$; value of each of which is determined by the position of those from respective n additional predetermined symbols in every said burst of M+n symbols in the step c) at the transmitting side, which values are not inverted from one burst to another;
k) deriving the meander signal of the interval frequency 1/T by means of comparing in phase said sum signal of the I and Q channels of the receiving side with those frequency components in the spectra of the signals of said I and Q channels of the receiving side. the frequency $\Omega_j$ value of each of which is determined by the position of those from respective n additional predetermined symbols in every burst of M +n symbols at the transmitting side, which values are just inverted from one burst to another;
l) forming bursts of M+n time samples in each of said I and Q channels of the receiving side using said meander signal at the intervals having a duration of $$T = \frac{2^k}{f_2};$$

m) dividing every formed burst of M+n time samples into two sets of $$\frac{M+n}{2}$$

symbols in each of said I and Q channels of the receiving side using a conversion from the time domain to the frequency domain;
n) in each of said I and Q channels of the receiving side, forming a set of M symbols from both said sets of $$\frac{M+n}{2}$$

symbols by means of discarding the n additional predetermined symbols;

o) in each of said I and Q channels of the receiving side, eliminating the phase ambiguity of the formed set of M symbols using said meander signal;

p) in each of said I and Q channels of the receiving side, forming a sequence of m-level samples of all sets of M symbols, which samples running with the frequency $f_1/2$;

q) forming an output information sequence of m-level symbols with the first clock frequency $f_1$ by means of combining said sequences of m-level samples in both I and Q channels of the receiving side.

2. The method according to claim 1, wherein, prior to said step a), a step of forming said information sequence of m-level samples by means of converting the bit symbol sequence running with the frequency $f_b = kf_1$.

3. The method according to claim 1, wherein, in said step h), in each of the I and Q channels of the transmitting side, multiplying said filtered sequence by a respective one of the quadrature components of the carrier frequency, and forming said signal for transmission by means of summing the results of said multiplications.

4. The method according to claim 1, wherein, said step f) comprises, at the transmitting side, the steps of:
subjecting one of two combined sequences of M+n time samples to the Hilbert transform;
delaying another one of said two sequences for a time of performing said Hilbert transform;
whereupon performing said step of adding. on the sample-to-sample basis, said converted and delayed sequences.

5. The method according to claim 1. wherein, in said step g), at the transmitting side, during the filtration process in said range of 0 to $f_2/2$, the spectra of each of the I and Q channels comprise:
the first frequency components $\cos \Omega_1 t, \cos \Omega_2 t, \ldots \cos \Omega_{n/2}t$, the frequency $\Omega_i$ value of each of which is determined by the position of those from respective n additional predetermined symbols in every said burst of M+n symbols in the step c) at the transmitting side, which values are not inverted from one burst to another; and
the second frequency components $$\sin\left[\Omega_1 t - \frac{\pi}{2} + \frac{\pi}{2} \cdot \frac{4}{\pi} \sum_{i=1,3,5\ldots}^{\infty} \frac{1}{i} \cdot \sin i\frac{\pi}{2T}t\right],$$

$$\sin\left[\Omega_2 t - \frac{\pi}{2} + \frac{\pi}{2} \cdot \frac{4}{\pi} \sum_{i=1,3,5\ldots}^{\infty} \frac{1}{i} \cdot \sin i\frac{\pi}{2T}t\right], \ldots,$$

$$\sin\left[\Omega_{n/2} t - \frac{\pi}{2} + \frac{\pi}{2} \cdot \frac{4}{\pi} \sum_{i=1,3,5\ldots}^{\infty} \frac{1}{i} \cdot \sin i\frac{\pi}{2T}t\right],$$

the frequency $\Omega_i$ value of each of which is determined by the position of those from respective n additional predetermined symbols in every burst of M+n symbols at the transmitting side, which values are just inverted from one burst to another.

6. The method according to claim 1 or 5, wherein the value of each of said n additional predetermined symbols is +1.

7. The method according to claim 5, wherein said step i) at the receiving side comprises steps of:
downconverting the signal being received to the intermediate frequency $$\frac{\omega_{IF}}{2\pi};$$

forming the signals of the first and second channels by means of multiplying the obtained signal of the intermediate frequency by the signals $\sin(\omega_{IF}-\Delta\omega)t$ and $\cos(\omega_{IF}-\Delta\omega)t$, respectively, where $$\frac{\Delta\omega}{2\pi}$$

is the frequency of approximate mismatch from the intermediate frequency $$\frac{\omega_{IF}}{2\pi};$$

digitizing the signals with the digitizing frequency equal to $2f_I$, in each of said first and second channels;
multiplying the digitized signal of said first channel by the signal $\cos \Delta\omega t$, and the digitized signal of said second channel by the signal $\sin \Delta\omega t$;
subjecting the signals obtained during this multiplication to the digital filtration, thus just separating the signal being received into a signal of the I channel of the receiving side and a signal of the Q channel of the receiving side.

8. The method according to claim 7, wherein said step i) further comprises steps of:
subtracting the signal of said Q channel of the receiving side from the signal of said I channel of the receiving side;
comparing in phase the obtained difference signal with said first frequency components $\cos \Omega_1 t, \cos \Omega_2 t, \ldots \cos \Omega_{n/2}t$;
performing the step of adjusting the frequency of approximate mismatch $$\frac{\Delta\omega}{2\pi}$$

by the signal obtained during the step of comparing said difference signal.

9. The method according to claim 7, wherein said step j) further comprises steps of:
comparing in phase said sum signal of the I and Q channels of the receiving side with said first frequency components $\cos \Omega_1 t, \cos \Omega_2 t, \ldots \cos \Omega_{n/2}t$;
performing the step of adjusting said digitizing frequency by the signal obtained during the step of comparing the sum signal with the first frequency components;
deriving the second clock frequency $f_2$ from said digitizing frequency.

10. The method according to claim 5, wherein, in said step k), comparing in phase said sum signal of the I and Q channels of the receiving side with said second frequency components $\sin \Omega_1 t, \sin \Omega_2 t, \ldots \sin \Omega_{n/2} t$, as a result of which deriving from the signals $$\sin\left[\Omega_1 t - \frac{\pi}{2} + \frac{\pi}{2} \cdot \frac{4}{\pi} \sum_{i=1,3,5\ldots}^{\infty} \frac{1}{i} \cdot \sin i \frac{\pi}{2T} t\right],$$

$$\sin\left[\Omega_2 t - \frac{\pi}{2} + \frac{\pi}{2} \cdot \frac{4}{\pi} \sum_{i=1,3,5\ldots}^{\infty} \frac{1}{i} \cdot \sin i \frac{\pi}{2T} t\right], \ldots,$$

$$\sin\left[\Omega_{n/2} t - \frac{\pi}{2} + \frac{\pi}{2} \cdot \frac{4}{\pi} \sum_{i=1,3,5\ldots}^{\infty} \frac{1}{i} \cdot \sin i \frac{\pi}{2T} t\right]$$

the signal $$\frac{4}{\pi} \sum_{i=1,3,5,\ldots}^{\infty} \frac{1}{i} \cdot \sin i \frac{\pi}{2T} t,$$

from which just deriving the signal of the interval frequency 1/T.

11. The method according to claim 10, wherein, in said steps m)-o) at the receiving side comprises steps of:
subjecting every of said burst of M+n time samples at the interval with the duration T to the direct Fourier transform, as a result of which obtaining two sets by $$\frac{M+n}{2}$$

symbols;
forming, from every pair of obtained sets by $$\frac{M+n}{2}$$

symbols, one set of M symbols;
multiplying every set of M symbols by the value of the signal $$\frac{4}{\pi} \sum_{i=1,3,5,\ldots}^{\infty} \frac{1}{i} \cdot \sin i \frac{\pi}{2T} t,$$

as a result of which just eliminating the phase ambiguity of the formed set of M symbols in each of the I and Q channels of the receiving side.

12. A system for transmitting and receiving quadrature amplitude modulation signals with the low synchronization threshold on the carrier frequency, which system comprising:
at the transmitting side:
a channel separator intended for separating the information sequence of the m-level symbols, where $m = 2^k$, $k = 2, 3, \ldots$, running at the first clock frequency $f_1$, into an I channel of the transmitting side with the even m-level symbols and a Q channel of the transmitting side with the odd m-level symbols, the running frequency of said m-level symbols in each of the I and Q channels of the transmitting side being equal to $f_1/2$;
a first and second burst formers each intended for storing bursts of M m-level symbols at the interval $$T = \frac{2 \cdot M}{f_1},$$

where $2^{L-1} < M < 2^L$, $L = 5, 6, 7, \ldots$, in the respective one of the I and Q channels of the transmitting side, and for supplementing every burst of M m-level symbols with n predetermined symbols to the total number of $M+n = 2^L$;
a first and second multipliers each intended for inverting values of the m-level symbols in the odd burst pairs in the I and Q channels of transmitting side, respectively;
a third and fourth multipliers each intended for inverting values of a half of the predetermined symbols supplemented to every odd burst pair in the I and Q channels of the transmitting side, respectively;
a third and fourth burst formers each intended for separating every burst of M+n symbols in two in the respective one of the I and Q channels of the transmitting side;
a first to fourth inverse Fourier transform units intended for replacing every burst of $$\frac{M+n}{2}$$

symbols with a set of M+n time samples using the inverse Fourier transform;
a first to fourth parallel-to-serial converters each intended for converting, in each of the I and Q channels of the transmitting side, each of the set of M+n time samples obtained from one of said bursts of M+n symbols into a correspondent sequence of M+n time samples with the second clock frequency $$f_2 = \frac{f_1 \cdot 2^k}{2M} = \frac{2^k}{T};$$

first and second Hilbert transform units each intended for shifting a phase by $\pi/2$ for all frequencies of the spectrum of the respective sequence from M+n time samples in the I and Q channels of the transmitting side, respectively;
a first and second delay units each intended for delaying another one of the sequences from M+n time samples in the I and Q channels of the transmitting side, respectively, for the time of processing in the respective Hilbert transform unit;
a first and second sample-to-sample adders each intended for combining, in the respective one of the I and Q channels of the transmitting side, the both sequences from M+n time samples obtained from the similarly named Hilbert transform unit and similarly named delay unit into a single sequence of the same length;
a first and second filter units each intended for filtering the combined sequence with the second clock frequency $f_2$ in the range of 0 to $f_2/2$ in the respective one of the I and Q channels of the transmitting side;
a waveform shaper for transmission intended for forming a signal for transmission from the filtered sequences in the I and Q channels of the transmitting side;
a clock-frequency discriminator intended for forming, from the first clock frequency, all clock frequencies necessary for the operation of the transmitting side units;
at the receiving side:

a quadrature conversion unit intended for separating the signal being received into digital sample sequences in the I channel of the receiving side and in the Q channel of the receiving side;

a clock-frequency discriminator intended for extracting clock frequencies using signals in the I and Q channels of the receiving side;

a first and second buffer units each intended for dividing the digital sample sequences in the respective one of the I and Q channels of the receiving side into bursts of M+n samples and for storing those bursts;

a first and second Fourier transform units each intended for performing, in the respective one of the I and Q channels of the receiving side, the direct Fourier transform on the bursts of M+n samples and for obtaining pairs of $$\frac{M+n}{2}$$

m-level samples;

a first and second sample extractors each intended for extracting M m-level samples from each pair of $$\frac{M+n}{2}$$

m-level samples in the respective one of the I and Q channels of the receiving side;

a first and second phase ambiguity elimination units each intended for eliminating a phase ambiguity of the respective one of the I and Q channels of the receiving side;

a first and second converters to m-level sequence each intended for forming sequences of m-level samples in the respective one of the I and Q channels of the receiving side;

a sequence combining unit intended for combining the sequences of m-level samples from the I and Q channels of the receiving side into one sequence of m-level samples running at the first clock frequency $f_1$.

13. The system according to claim 12, wherein at the transmitting side prior to said channel separator, a m-level sample former is mounted, which is intended for converting the initial information sequence of the bit symbols running with the frequency $kf_1$ to said sequence of the m-level symbols.

14. The system according to claim 12, wherein at the transmitting side, said waveform shaper for transmission comprises a fifth and sixth multipliers each intended for multiplying, in each of the I and Q channels of the transmitting side, the filtered sequence by the respective one of the quadrature components, and an adding unit intended for adding the results of multiplication of the fifth and sixth multipliers.

15. The system according to claim 12, wherein at the receiving side, after said sequence combining unit, a converter to binary sequence is mounted, which is intended for converting the combined sequence of m-level samples from the sequence combining unit into an information sequence of bit symbols with the clock frequency $kf_1$.

16. The system according to claim 12, wherein at the receiving side, the quadrature conversion unit comprises:

a seventh and eighth multipliers each intended for multiplying an input signal by a respective quadrature component with the frequency $$\frac{\omega_{IF} - \Delta\omega}{2\pi},$$

where $$\frac{\Delta\omega}{2\pi}$$

is a frequency of approximate mismatch from the intermediate frequency $$\frac{\omega_{IF}}{2\pi};$$

a first and second filters each intended for extracting sine and cosine components of the signal being received, respectively;

a first and second analog-to-digital converters each intended for converting a respective component of the signal being received to digital samples with the double second clock frequency $f_2$;

a digital quadrature demodulator intended for demodulating signals of in-phase and quadrature channels;

a first and second optimal digital filters intended for making the optimal digital filtration of the demodulated signals of the in-phase and quadrature channel, respectively.

17. The system according to claim 16, wherein at the receiving side, the digital quadrature demodulator comprises:

a ninth and tenth multipliers each intended for multiplying the sine component of the input signal by the respective quadrature component of the frequency $$\frac{\Delta\omega}{2\pi};$$

an eleventh and twelfth multipliers each intended for multiplying the cosine component of the input signal by the respective quadrature component of the frequency $$\frac{\Delta\omega}{2\pi};$$

a controlled frequency synthesizer forming, from the intermediate frequency adjusting signal, the sine component of the signal with the frequency $$\frac{\Delta\omega}{2\pi}$$

for feeding to the ninth and eleventh multipliers and the cosine component of the signal with the frequency $$\frac{\Delta\omega}{2\pi}$$

for feeding to the tenth and twelfth multipliers;

a subtractor intended for determining a difference of the signals from the tenth and eleventh multipliers;

a summer intended for summing the signals from the ninth and twelfth multipliers.

18. The system according to claim 12, wherein at the receiving side, the clock-frequency discriminator comprises:

a first to third phase-locked-loop (PLL) units, which first and second inputs are intended for receiving signal of the I and Q channels of the receiving side, respectively;

the output of the first PLL unit is intended for producing an intermediate frequency adjusting signal fed to the quadrature conversion unit;

the first and second outputs of the second PLL unit are intended, respectively, for producing a signal with the frequency $$\frac{kf_1}{M}$$

fed to the first and third PLL units, first and second buffer units, and first and second DFT units, and a meander signal $$\frac{4}{\pi}\sum_{i=1,3,5,\ldots}^{\infty}\frac{1}{i}\sin i\frac{\pi}{2T}t$$

of interval frequency fed to the first and second phase ambiguity elimination units;

the output of the third PLL unit is intended for producing a clock frequency adjusting signal to a frequency component forming unit;

the frequency component forming unit, which input is intended for receiving the clock frequency adjusting signal from the third PLL unit;

the first group outputs of the frequency component forming unit are connected to respective inputs of the group of inputs of the first and third PLL units, and second group outputs are connected to respective group of inputs of the second PLL unit;

the first output of the frequency component forming unit is intended for producing signals with the frequency $$\frac{f_1 2^k}{M}$$

to the quadrature conversion unit;

the second output of the frequency component forming unit is intended for producing signals with the second clock frequency $$\frac{f_1 2^k}{2M}$$

to the first and second buffer units;

the third output of the frequency component forming unit is intended for producing signals with the frequency $kf_1$ to the converter to binary sequence;

the fourth output of the frequency component forming unit is intended for producing signals with the first clock frequency $f_1$ to the sequence combining unit and to the converter to binary sequence;

the fifth output of the frequency component forming unit is intended for producing signals with the frequency $f_1/2$ to the first and second converters to m-level sequence and to the sequence combining unit.

19. A non-transitory computer-readable medium intended for the direct operation as a part of a computer and comprising a program for implementing the method according to claim 1.

20. A method for synchronizing the reception of Quadrature modulation (QAM) signals at the interval $$T = \frac{2^k M}{f_1}$$

comprising utilizing the method of claim 1.

* * * * *